United States Patent
Qi et al.

(10) Patent No.: US 10,411,587 B2
(45) Date of Patent: Sep. 10, 2019

(54) FAULT ISOLATION AND SYSTEM RESTORATION USING POWER CONVERTER

(71) Applicant: ABB Schweiz Ag, Baden (CH)

(72) Inventors: Li Qi, Cary, NC (US); Helen-Xing Huang, Beijing (CN); Xianyong Feng, Cary, NC (US); Jiuping Pan, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/840,737

(22) Filed: Dec. 13, 2017

(65) Prior Publication Data

US 2018/0166972 A1 Jun. 14, 2018

Related U.S. Application Data

(60) Provisional application No. 62/433,830, filed on Dec. 14, 2016.

(51) Int. Cl.
*H02M 1/32* (2007.01)
*H02M 1/08* (2006.01)
(Continued)

(52) U.S. Cl.
CPC .............. *H02M 1/32* (2013.01); *H02M 1/08* (2013.01); *H02M 7/219* (2013.01); *H02M 7/483* (2013.01); *H02M 2007/4835* (2013.01)

(58) Field of Classification Search
CPC ........... H02M 1/32; H02M 1/08; H02M 7/219
See application file for complete search history.

(56) References Cited

U.S. PATENT DOCUMENTS

2013/0308235 A1* 11/2013 Davies ................ H02H 7/1257
361/62
2017/0163170 A1* 6/2017 Tahata ..................... H02J 5/00
(Continued)

FOREIGN PATENT DOCUMENTS

EP 1914162 B2 10/2006
WO 2011029480 A1 3/2011
(Continued)

OTHER PUBLICATIONS

Tang L., et al., "Locating and Isolating DC Faults in Multi-Terminal DC Systems", IEEE Trans. On Power Delivery, vol. 22, No. 3, Jul. 2007, 8 pgs.

(Continued)

*Primary Examiner* — Nguyen Tran
*Assistant Examiner* — Demetries A Gibson
(74) *Attorney, Agent, or Firm* — Taft Stettinius & Hollister LLP; J. Bruce Schelkopf

(57) ABSTRACT

Unique systems, methods, techniques and apparatuses of a DC fault isolation system are disclosed. One exemplary embodiment is a power conversion system comprising a converter including a midpoint connection structured to receive AC power, a first converter arm, a second converter arm, and a control system. The control system is configured to operate the converter a fault condition mode in response to a DC fault condition, wherein the fault condition mode operates at least one full bridge cell of the second converter arm so as to interrupt current flowing between the midpoint connection and the second DC bus rail and operates the first converter arm so as to allow the AC power to flow between the midpoint connection and the first DC bus rail in response to detecting the DC fault condition.

17 Claims, 4 Drawing Sheets

(51) Int. Cl.
  *H02M 7/219* (2006.01)
  *H02M 7/483* (2007.01)

(56) References Cited

U.S. PATENT DOCUMENTS

2018/0076735 A1* 3/2018 Bakran .................. H02M 7/49
2018/0083550 A1* 3/2018 Chung .................. H02M 1/32
2018/0138826 A1* 5/2018 Jimichi ................ H02M 7/497
2018/0166877 A1   6/2018 Depreville

FOREIGN PATENT DOCUMENTS

WO    2011157300 A1   12/2011
WO    2013079937 A2    6/2013
WO    2016135247 A1    9/2016

OTHER PUBLICATIONS

Baker, Carl "HVDC as bulk power transfer system", SUPERGEN Wind 5th Training Seminar, Mar. 2011, 47 pgs, Jun. 9, 2018.
Marquardt, Rainer, "Modular Multilevel Converter Topologies with DC-Short Circuit Current Limitation", May 30-Jun. 3, 2011 8 International Conference on Power Electronics, 7 pgs.

* cited by examiner

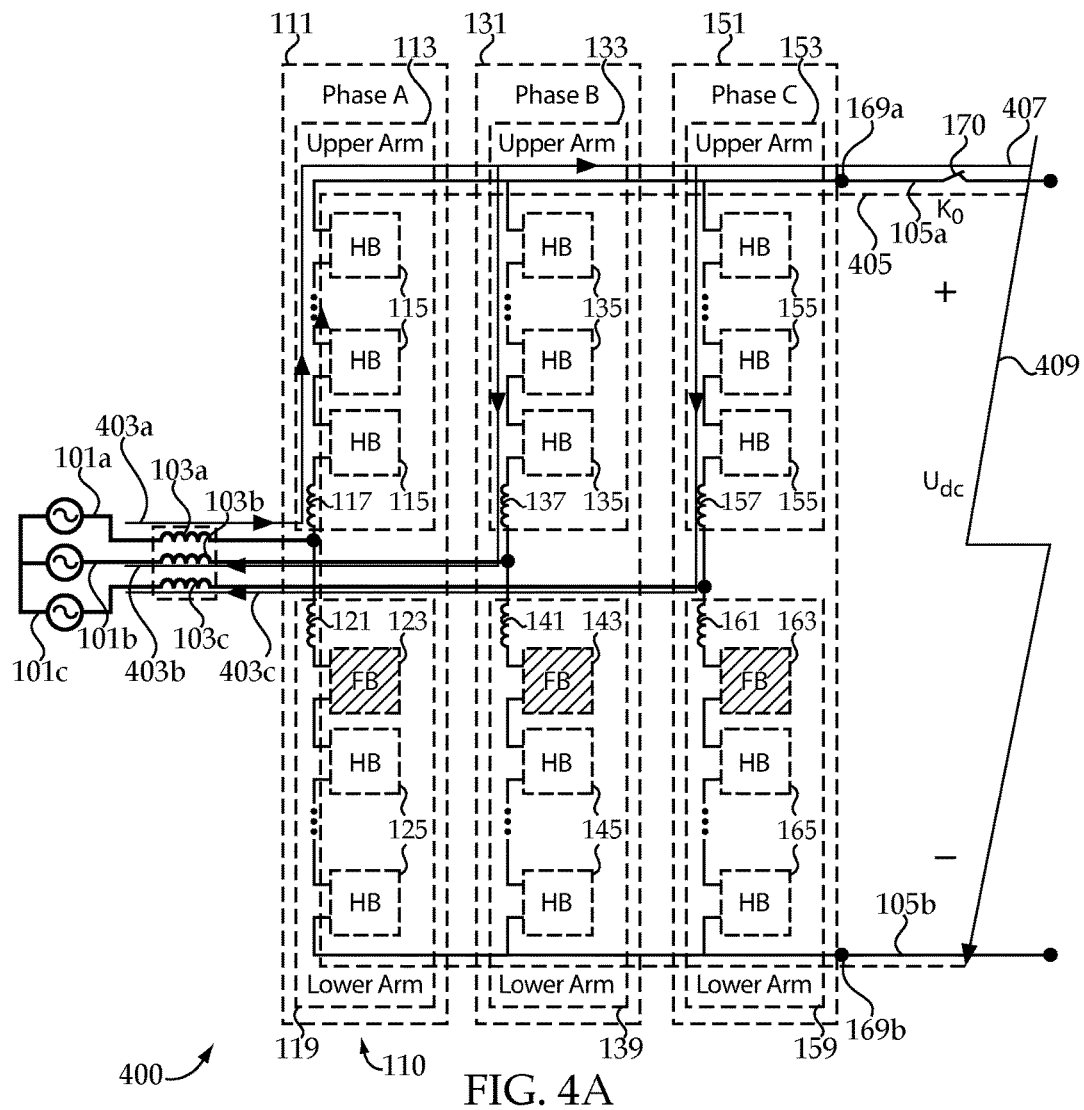
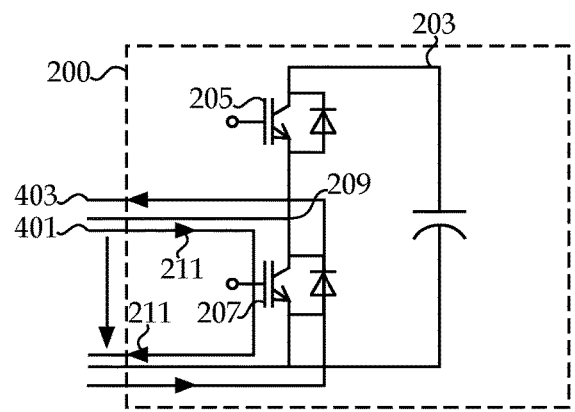
FIG. 4A
FIG. 4B

FAULT ISOLATION AND SYSTEM RESTORATION USING POWER CONVERTER

BACKGROUND

The present disclosure relates generally to a direct current (DC) fault isolation system. Rapid fault detection and isolation is essential for protecting components in a DC power distribution system. Existing DC fault isolation systems suffer from a number of shortcomings and disadvantages. There remain unmet needs including decreasing fault isolation response time, decreasing DC fault current magnitude before fault isolation, reducing the number of components in the fault isolation system, increasing system reliability, increasing system stability, and decreasing the offline time of the system. For instance, some DC fault isolation systems require passive component charging before assisting a DC circuit breaker to isolate a fault. Other DC fault isolation systems include power converters with semiconductor devices used solely to interrupt fault current. There is a significant need for the unique apparatuses, methods, systems and techniques disclosed herein.

DISCLOSURE OF ILLUSTRATIVE EMBODIMENTS

For the purposes of clearly, concisely and exactly describing non-limiting exemplary embodiments of the disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

SUMMARY

Unique systems, methods, techniques and apparatuses for a DC fault isolation system are disclosed. One embodiment includes operating an AC/DC converter in response to a DC fault by interrupting current flow through a first arm of the converter and transmitting AC current through a second arm of the converter. Further embodiments, forms, objects, features, advantages, aspects and benefits of the disclosure shall become apparent from the following description and drawings.

BRIEF DESCRIPTION OF THE DRAWINGS

FIG. 4A-4B illustrate the current flowing through an exemplary fault isolation system during a fault isolation operation by the MMC.

DETAILED DESCRIPTION OF ILLUSTRATIVE EMBODIMENTS

Figure 1:
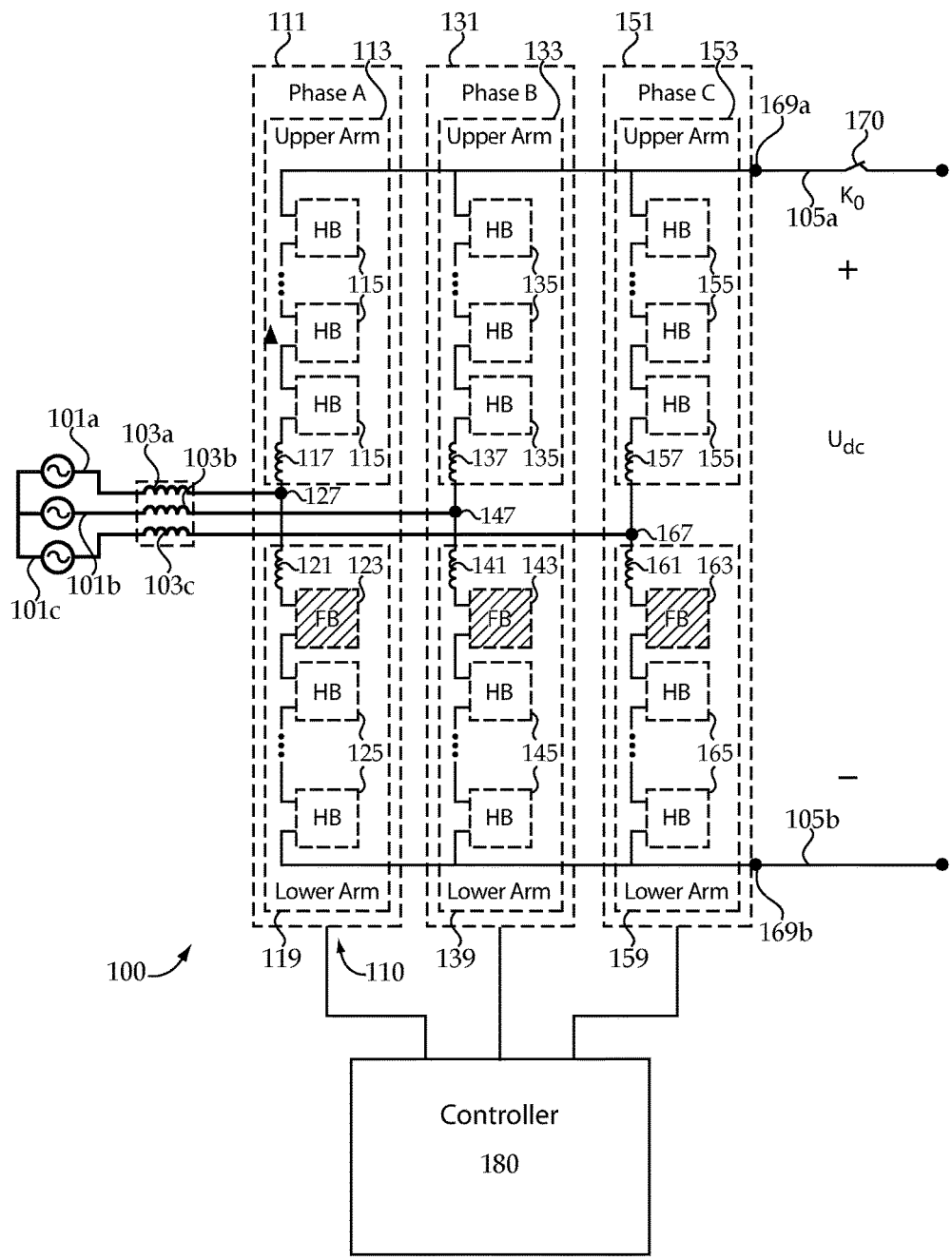
FIG. 1 illustrates an exemplary fault isolation system.

With reference to FIG. 1 there is illustrated an exemplary DC fault isolation system 100. It shall be appreciated that system 100 may be implemented in a variety of medium voltage direct current and high voltage direct current applications, including distribution networks embedded in alternating current (AC) systems, transmission networks, industrial systems, renewable energy collection systems, shipboard power systems, data centers, and building systems, to name but a few examples. Medium and high voltage may include voltages greater than or equal to 10 kV.

System 100 includes a modular multilevel converter (MMC) 110 coupled to a multiphase power source including three phases 101a, 101b, 101c. Specifically, MMC 110 includes a plurality of input ports 127, 147, and 167, each coupled to one phase of the multiphase power source. In other embodiments, MMC 110 is coupled to a multiphase power source with a different number of phases or a single phase power source. In certain embodiments, the multiphase power source is replaced with multiple DC power sources or a DC power source with multiple outputs such that MMC 110 receives DC power with a first voltage and converts the received DC power to DC power with a different, second voltage. In the illustrated embodiment, each phase of the multiphase power source is coupled to MMC 110 by way of inductors 103a, 103b, 103c. In certain embodiments, inductors 103a, 103b, 103c represent equivalent line inductance between MMC 110 and a power source. MMC 110 is also coupled to a positive pole DC rail 105a by way of an output port 169a and a negative pole DC rail 105b by way of an output port 169b.

System 100 includes a DC protective device 170 structured to interrupt the flow of DC fault current. In certain embodiments, device 170 is a DC circuit breaker. In other embodiments, device 170 is a disconnector, a load switch, or any controllable switching device. In other embodiments, device 170 is a semiconductor switch, such as an integrated gate-commutated thyristor (IGCT). In the illustrated embodiment, device 170 is coupled to positive pole DC rail 105a. In other embodiments, device 170 is coupled to negative pole DC rail 105b.

MMC 110 is structured to receive AC power from phases 101a-101c, convert the AC power to DC power, and output the DC power to rails 105a and 105b. MMC 110 includes three converters 111, 131, and 151. Converter 111 includes an upper arm 113 and a lower arm 119. Upper arm 113 includes an inductor 117 coupled to input port 127, also known as a midpoint connection, and coupled to a plurality of series coupled half bridge power cells 115. The plurality of half bridge cells 115 are also coupled to output port 169a. Lower arm 119 includes an inductor 121 coupled to input port 127 and a full bridge power cell 123. A plurality of series coupled half bridge cells 125 are coupled between full bridge cell 123 and output port 169b.

In other embodiments, upper arm 113 includes at least one full bridge cell and lower arm 119 does not include full bridge cell 123. In certain embodiments, upper arm 113 includes at least one full bridge cell. In other embodiments, one or more of the half bridge cells of converter 111 are replaced with a full bridge cell. It shall be appreciated that any or all of the foregoing features of converter 111 may also be present in the other converters disclosed herein.

Converter 131 includes an upper arm 133 and a lower arm 139. Upper arm 133 includes an inductor 137 coupled to input port 147, also known as a midpoint connection, and coupled to a plurality of series coupled half bridge cells 135. The plurality of half bridge cells 135 are also coupled to output port 169*a*. Lower arm 139 includes an inductor 141 coupled to port 147 and a full bridge cell 143. A plurality of series coupled half bridge cells 145 are coupled to full bridge cell 143 and output port 169*b*.

Converter 151 includes an upper arm 153 and a lower arm 159. Upper arm 153 includes an inductor 157 coupled to input port 167, also known as a midpoint connection, and coupled to a plurality of series coupled half bridge cells 155. The plurality of half bridge cells 155 are also coupled to output port 169*a*. Lower arm 159 includes an inductor 161 coupled to input port 167 and a full bridge cell 163. A plurality of series coupled half bridge cells 165 are coupled to full bridge cell 163 and output port 169*b*.

System 100 includes a controller 180 structured to operate the half bridge cells and full bridge cells of MMC 110, during a normal operation mode, so to convert the AC power received with input ports 127, 147, and 167 to DC power, and output the DC power to output ports 169*a* and 169*b*. Controller 180 may transmit activation signals generated using pulse width modulation in order to operate the half bridge cells and full bridge cells of MMC 110.

Controller 180 is configured to detect a DC fault condition, limit fault current, and isolate the DC fault condition during a DC fault condition mode. For example, controller 180 may detect a short circuit fault occurring on DC rail 105*a* or DC rail 105*b* by using a current sensor or receiving a signal from protective device 170. As explained in more detail below, controller 180 is configured to assist DC protective device 170 by decreasing the current flowing out of MMC 110 to device 170 in response to detecting the DC fault condition. Once current flowing through device 170 is eliminated, device 170 may be opened during a zero current condition. A zero current may include a range of current from 0 A to 10% of a rated current for MMC 110. Following a fault clearance, controller 180 is configured to resume normal operation of MMC 110 and DC protective device 170 is closed.

Figure 2A:
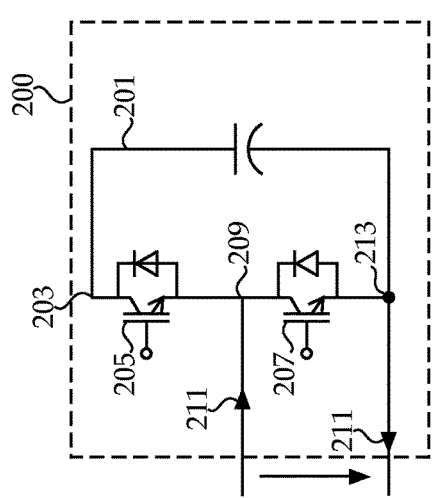
FIGS. 2A-2B illustrate power cells of a modular multilevel converter (MMC) for an exemplary fault isolation system.

With reference to FIG. 2A there is illustrated an exemplary half bridge power cell 200, such as one of the half bridge power cells of MMC 110 in FIG. 1. Power cell 200 includes a capacitor 201 coupled in parallel with a converter leg 203. In certain embodiments, power cell 200 includes a plurality of capacitors. Converter leg 203 includes two semiconductor switches 205, 207 coupled in series at a midpoint connection 209. Switches 205 and 207 are each coupled in an anti-parallel configuration with a diode. Switch 205 includes a first terminus coupled to capacitor 201 and a second terminus coupled to midpoint connection 209. Switch 207 includes a first terminus coupled to midpoint connection 209 and a second terminus coupled to capacitor 201 by way of an output point 213. Depending on the operation of switches 205 and 207, a current 211 may flow through power cell 200 by way of output point 213 and midpoint connection 209.

In the illustrated embodiment, switches 205 and 207 are insulated gate-commutated thyristors (IGCTs). In other embodiments, the semiconductor switches may include bipolar junction transistors (BJTs), metal oxide semiconductor field effect transistors (MOSFETs), gate turn-off thyristors (GTOs), MOS-controlled thyristors (MCTs), integrated gate bipolar transistors (IGBTs), silicon carbide (SiC) switching devices, gallium nitride (GaN) switching devices, or any other type of switch structured to selectively control the flow of electric current. It shall be appreciated that any or all of the foregoing features of switches 205 and 207 may also be present in the other switches disclosed herein.

Figure 2B:
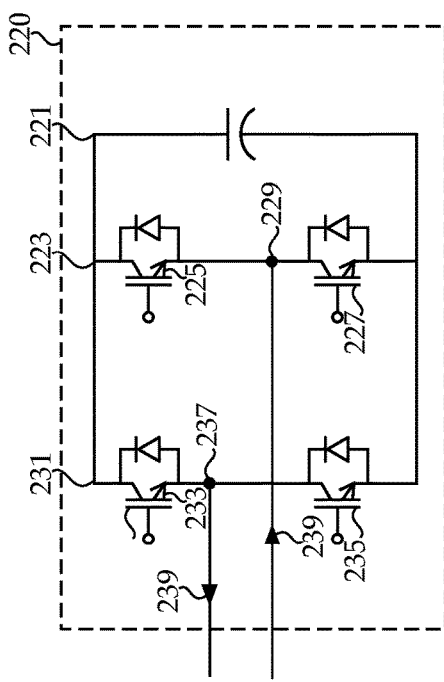

With reference to FIG. 2B there is illustrated an exemplary full bridge power cell 220, such as one of the full bridge power cells of MMC 110 in FIG. 1. Power cell 220 includes a capacitor 221 coupled in parallel with two converter legs 223, 231. In certain embodiments, power cell 220 includes a plurality of capacitors. Converter leg 223 includes two semiconductor switches 225, 227 coupled at a midpoint connection 229. Switches 225 and 227 are each coupled in an anti-parallel configuration with a diode. Switch 225 includes a first terminus coupled to capacitor 221 and a second terminus coupled to midpoint connection 229. Switch 227 includes a first terminus coupled to midpoint connection 229 and a second terminus coupled to capacitor 221.

Converter leg 231 includes two semiconductor switches 233, 235 coupled at a midpoint connection 237. Switches 233 and 235 are coupled in an anti-parallel configuration with a diode. Switch 233 includes a first terminus coupled to capacitor 221 and a second terminus coupled to midpoint connection 237. Switch 235 includes a first terminus coupled to midpoint connection 237 and a second terminus coupled to capacitor 221. Depending on the operation of switches 225, 227, 233, and 235, a current 239 may flow through cell 220 by way of midpoint connections 229 and 237. Cell 220 may interrupt the flow of current through cell 220 by opening each switch 225, 227, 233, and 235. Cell 220 is structured to withstand the overvoltage caused by the interruption of current flow. For example, full bridge cells in a converter structured to output 10 kV DC should be structured to withstand an overvoltage at least 20% greater than nominal voltage.

Figure 3:
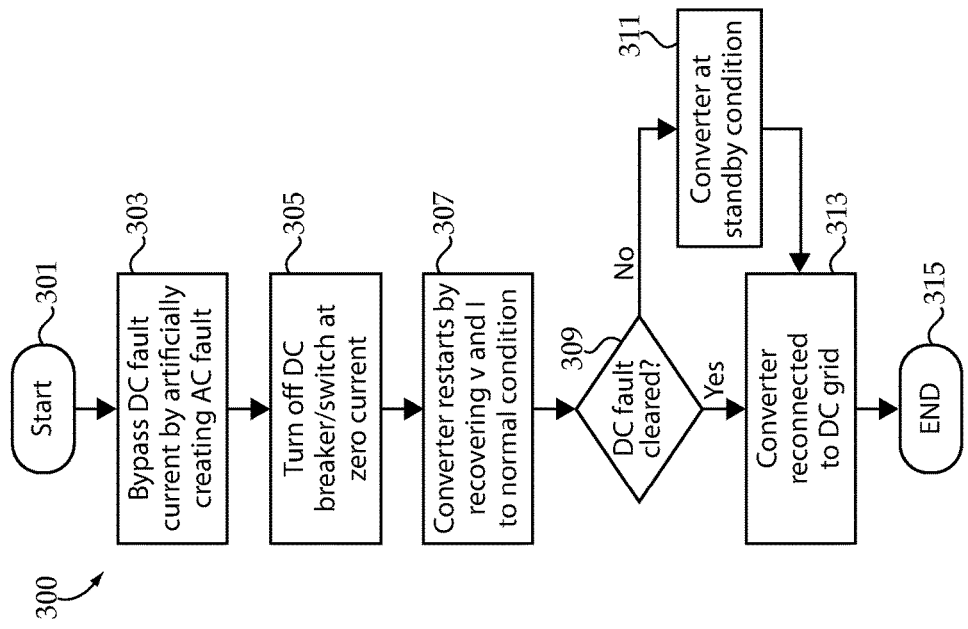
FIG. 3 is a flowchart illustrating an exemplary DC fault isolation and system restoration process.

With reference to FIG. 3, there is a flowchart illustrating an exemplary DC fault isolation and system restoration process 300 for a fault isolation system, such as system 100 of FIG. 1. Process 300 may be implemented in whole or in part in one or more controllers, such as controller 180 of FIG. 1. In certain forms, operation of the MMC converter and DC protective device may be performed by separate controllers.

Process 300 begins at start operation 301 and proceeds to operation 303 where a DC fault current is detected and controller 180 operates MMC 110 so as to generate an intentional short circuit within MMC 110. The operation of MMC 110 reduces fault current flowing from the AC power source to the DC fault. Specifically, controller 180 allows bidirectional current to flow through the upper arms of MMC 110 while interrupting the flow of current through the lower arms of MMC 110. At the point of DC protective device 170, the combined current of the multiphase power source quickly approaches 0 A.

With reference to FIG. 4A, there is illustrated current flow through MMC 110 of system 100 in FIG. 1 during operation 303 of FIG. 3. After a DC fault condition 409 is detected, controller 180 operates MMC 110 such that currents 403*a*-403*c* flow through upper arms 113, 133, and 153, and a DC current 405 flows through converter 110. Controller 180 also interrupts the flow of current from the multiphase power source to negative pole DC rail 105*b* using full bridge cells 123, 143, and 163. Controller 180 may operate full bridge cells 123, 143, and 163 in order to interrupt the flow of current within 2 ms. Given the short response time following a DC fault current detection, full bridge cells 123, 143, and 163, will interrupt a fault current with a magnitude proximate to nominal current, such as two times nominal current. Controller 180 may also open the switches of the half bridge cells of lower arms 119, 139, and 159 in order to prevent the capacitors of the half bridge cells from discharging.

With reference to FIG. 4B, there is illustrated bidirectional current flow through an half bridge power cell 200 of FIG. 2 during operation 303 of FIG. 3. Bidirectional current including current 403 flowing in a first direction and current 401 flowing in an opposite direction is generated when controller 180 closes switch 207. Controller 180 opens switch 205 to prevent capacitor discharge.

With continuing reference to FIG. 3, Process 300 proceeds from operation 303 to operation 305 where DC protective device 170 is opened under a zero current condition. Once controller 180 uses MMC 110 to create an intentional short circuit within MMC 110, there is no longer fault current flowing through DC protective device 170. Under a zero current condition, device 170 opens to isolate the multiphase power source from the DC fault.

Process 300 then proceeds to operation 307 where MMC 110 resumes normal operation while unconnected to a DC distribution network. Since controller 180 operates the half bridge cells and full bridge cells of MMC 110 so as to prevent capacitor discharge, MMC 110 may resume normal operation without precharging the capacitors of MMC 110. Controller 180 may operate MMC 110 using a feedback control algorithm.

Figure 5:
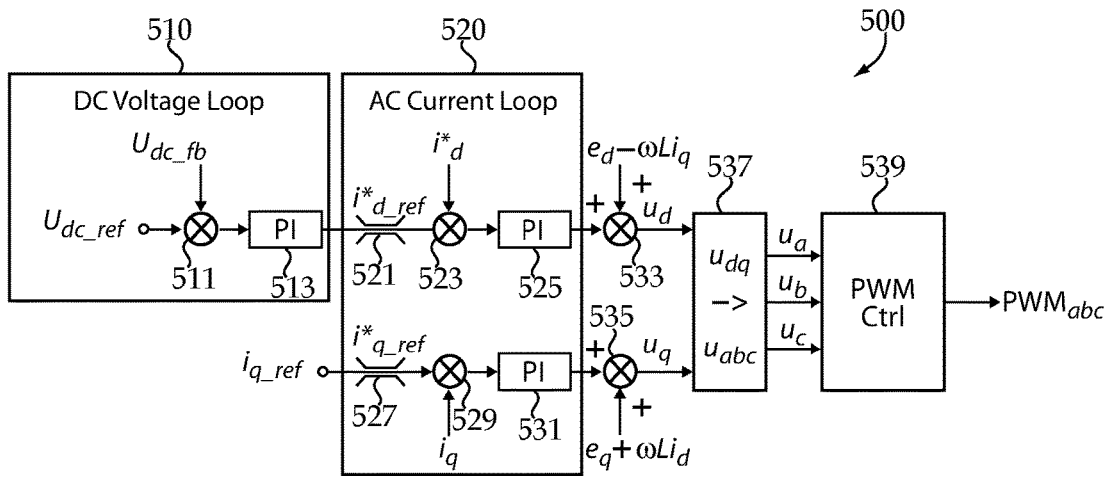
FIG. 5 is a schematic block diagram illustrating a controller for an exemplary fault isolation system.

With reference to FIG. 5 there is illustrated an exemplary converter controller 500 structured to operate the switches of an exemplary converter, such as MMC 110 of FIG. 1, during operation 307 of process 300. Controller 500 includes a DC voltage control loop configured to receive a measurement of the DC output voltage of MMC 110, $U_{dc\_fb}$, and a DC output reference voltage, $U_{dc\_ref}$. The difference between the DC output voltage of MMC 110 and the DC output reference voltage is calculated with a difference module 511 and transmitted to a PI controller 513 which uses the calculated difference to calculate the active power reference value, $i_{d\_ref}$ for the AC power provided by the multiphase power source.

Controller 500 includes an AC current loop 520 which includes a limiter module 521, an difference module 523, and a PI controller 525. Module 521 is configured to receive the active power reference value from PI controller 513 and confine the reference value to a range of values. Difference module 523 is configured to receive the active power reference value and an active power measurement, $i_d$, and calculate the difference between the two values. PI controller 525 receives the calculated results of module 523 and outputs a direct-axis voltage reference value. AC current loop 520 also includes a limiter module 527 configured to receive and limit a reactive power reference value, $i_{q\_ref}$. A difference module 529 is configured to receive the result of module 527 and a reactive power measurement, $i_q$, and calculate the difference between $i_{q\_ref}$ and $i_q$. A PI controller 531 is structured to receive the results from module 529 and output a quadrature-axis voltage reference value.

A difference module 533 is configured to calculate the difference between the voltage direct-axis reference value from PI controller 525 as well as a measured d-axis voltage minus the estimated quadrature-axis voltage drop across the inductors of MMC 110. A difference module 535 is configured to calculate the difference between the results from module 531 and the measured quadrature axis voltage plus the estimated d-axis voltage across the inductors.

Controller 500 includes a variable transformation module 537 which receives the direct-quadrature voltage reference values from modules 533 and 535, and converts the references values to a three phase reference frame. Module 537 then transmits the transformed three phase reference values to a pulse width modulation controller 539 configured to generate a plurality of activation signals configured to operate the switching devices of MMC 110.

With continuing reference to FIG. 3, Process 300 proceeds from operation 307 to conditional 309 where controller 180 determines whether the DC fault has been cleared. If the DC fault has not been cleared, process 300 proceeds to operation 311 where MMC 110 operates in a standby mode until the DC fault is cleared. In standby mode, MMC 110 operates so as to produce a DC voltage potential as a hot-spare/backup source.

Once the DC fault has been cleared, process 300 proceeds to operation 313 where MMC 110 is reconnected to the DC distribution network. Process 300 then ends at end operation 315.

Figure 6:
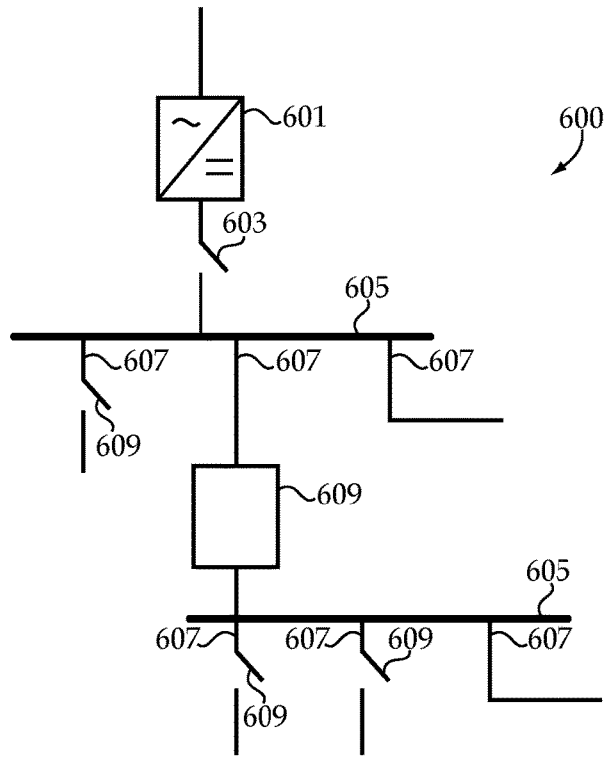
FIG. 6 illustrates a DC power distribution system with an exemplary DC fault isolation system.

With reference to FIG. 6 there is illustrated a DC power distribution system 600 which includes an MMC 601 coupled to an AC power supply system. System 600 also includes a DC protective device 603 coupled to MMC 601. MMC 601 is structured to receive power from an AC power source, convert the AC power to DC power, and transmit the DC power to a DC power distribution network which includes a plurality of DC buses 605 and load branches 607 radially coupled to the DC buses 605. The DC distribution network includes a plurality of DC protective devices 609 operatively coupled to various load branches 607 of the DC distribution network. A switch 611 is coupled between the two DC buses 605.

MMC 601 and protective device 603 are controlled so as to isolate DC faults using the fault isolation and system restoration process previously explained with respect to system 100 of FIG. 1 and process 300 of FIG. 3. In certain embodiments, system 600 is structured to partially restore power to the DC distribution network by operating one of the plurality of DC protective devices 609 so as to isolate the fault from the rest of the DC distribution network before resuming normal operation of MMC 601 and closing protective device 603.

It shall be further appreciated that a number of variations and modifications to process 300 are contemplated including, for example, the omission of one or more aspects of process 300, the modification of one or more of the operations or conditional, the addition of further conditionals and operations and/or the reorganization or separation of operations and conditionals into separate processes.

Further written description of a number of exemplary embodiments shall now be provided. One embodiment is a power conversion system comprising a converter including a midpoint connection structured to receive AC power, a first converter arm comprising a first plurality of half bridge cells and coupled between the midpoint connection and a first DC bus rail, and a second converter arm comprising a second plurality of half bridge cells and at least one full bridge cell, the second converter arm coupled between the midpoint connection and a second DC bus rail; and a control system configured to: operate the converter in a normal operation mode so as to convert the AC power to DC power and output the DC power to the first DC bus rail and the second DC bus rail, detect a DC fault condition, and operate the converter in a fault condition mode in response to the DC fault condition, wherein the fault condition mode operates the at least one full bridge cell of the second converter arm so as to interrupt current flowing between the midpoint connection and the second DC bus rail and operates the first converter arm so as to allow the AC power to flow between the midpoint connection and the first DC bus rail in response to detecting the DC fault condition.

In certain forms of the foregoing system, the system comprises a protective device coupled to the first DC bus rail, wherein the control system is configured to operate the protective device in order to selectively interrupt current flow through the first DC bus rail. In certain forms, the protective device is a disconnector. In certain forms, the control system, during the fault condition mode, is configured to detect a zero current condition at the protective device while the control system is operating the first converter arm so as to allow the AC power to flow between the midpoint connection and the first DC bus rail, and opening the protective device in response to detecting the zero current condition. In certain forms, the control system operates the converter in the normal operation mode following the opening of the protective device but before the control system detects a clearance of the DC fault condition. In certain forms, each half bridge cell of the first plurality of half bridge cells and the second plurality of half bridge cells includes a pair of series coupled semiconductor switches and a capacitor, and wherein the control system is configured to operate the semiconductor switches during the fault condition mode so as to prevent capacitor discharge of the capacitor of each half bridge cell. In certain forms, each full bridge cell includes two pairs of series coupled semiconductor switches and wherein the control system operates the second converter arm so as to interrupt current flowing between the midpoint connection and the second DC bus rail by opening each of the semiconductor switches. In certain forms, the converter is structured to receive three phase AC power.

Another exemplary embodiment is a fault isolation system comprising a modular multilevel converter (MMC) including: an input port structured to be coupled to a multiphase AC power source, a first output port structured to be coupled to a first DC bus rail, and a second output port structured to be coupled to a second DC bus rail, a protective device coupled to the first output port and structured to interrupt current flow through the first DC bus rail; and a control system coupled to the MMC and the protective device, and configured to detect a DC fault condition, operate the MMC so as to interrupt current flow from the input port to the second output port in response to detecting the DC fault condition, operate the MMC so as to allow AC power flow from the input port to the first output port in response to detecting the DC fault condition, detect a zero current condition at the first output port, and interrupt current flow through the first DC bus rail using the protective device in response to detecting a zero current condition at the first output port.

In certain forms of the foregoing system, the protective device is a DC circuit breaker. In certain forms, the MMC includes three upper arms, each arm including a plurality of series coupled half bridge cells coupled between the input port and the first output port such that each phase of the AC power received with the MMC is separately coupled to one arm of the MMC. In certain forms, the MMC includes three lower arms, each arm including a full bridge cell coupled between the input port and the second output port such that each phase of the AC power received with the MMC is separately coupled to one arm of the MMC. In certain forms, each of the three lower arms includes a plurality of half bridge cells. In certain forms, the control system is a plurality of controllers. In certain forms, the control system is configured to operate the MMC in a normal operation mode so as to receive the multiphase AC power and convert the multiphase AC power to DC power, and wherein the control system is configured to operate the MMC in normal operation mode in response to interrupting current flow through the first DC bus rail using the protective device, to detect a clearance of the DC fault condition, and to close the protective device in response to detecting the clearance of the DC fault condition.

A further exemplary embodiment is a method for operating a modular multilevel converter (MMC) comprising coupling an MMC input to a power source; coupling a first MMC output to a first DC bus rail; coupling a second MMC output to a second DC bus rail; operating the MMC in a first operating mode including receiving power with the MMC input, converting the power to DC power, and outputting the DC power with the first MMC output and the second MMC output; detecting a DC fault condition; and operating the MMC in a second mode in response to detecting a DC fault condition including receiving power with the MMC input, interrupting current flow between the MMC input and the second MMC output, and transmitting the received power between the MMC input to the first MMC output.

In certain forms of the foregoing method, the method comprises coupling a DC protective device to the first DC bus rail, detecting a zero current condition on the first DC bus while operating the MMC in the second mode, and opening the DC protective device during the zero current condition. In certain forms, the method comprises operating the MMC a second time in the normal operating mode, detecting a resolution of the DC fault condition, and closing the DC protective device in response to detecting the resolution of the DC fault condition. In certain forms, the MMC includes a plurality of half bridge cells coupled in series between the MMC input and the first MMC output and does not include a full bridge cell coupled between the MMC input and the first MMC output. In certain forms, the DC power is medium voltage direct current power or high voltage direct current power.

It is contemplated that the various aspects, features, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with or a connection to another item as well as a belonging to or a connection with the other item as informed by the context in which it is used. The terms "coupled to," "coupled with" and the like include indirect connection and coupling and further include but do not require a direct coupling or connection unless expressly indicated to the contrary. When the language "at least a portion" and/or "a portion" is used the item can include a portion and/or the entire item unless specifically stated to the contrary.

What is claimed is:

1. A power conversion system comprising:
a converter including:
  a midpoint connection structured to receive AC power,
  a first converter arm comprising a first plurality of half bridge cells and coupled between the midpoint connection and a first DC bus rail, and
  a second converter arm comprising a second plurality of half bridge cells and at least one full bridge cell, the second converter arm coupled between the midpoint connection and a second DC bus rail;
a protective device coupled to the first DC bus rail; and
a control system configured to: operate the converter in a normal operation mode so as to convert the AC power to DC power and output the DC power to the first DC bus rail and the second DC bus rail, detect a DC fault condition, and operate the converter in a fault condition mode in response to the DC fault condition, wherein the fault condition mode detects a zero current condition at the protective device while the control system is operating the first converter arm so as to allow the AC power to flow between the midpoint connection and the first DC bus rail, and opens the protective device in response to detecting the zero current condition;
wherein the fault condition mode operates the at least one full bridge cell of the second converter arm so as to interrupt current flowing between the midpoint connection and the second DC bus rail and operates the first converter arm so as to allow the AC power to flow between the midpoint connection and the first DC bus rail in response to detecting the DC fault condition.

2. The system of claim 1, wherein the protective device is a disconnector.

3. The system of claim 1 wherein the control system operates the converter in the normal operation mode following the opening of the protective device but before the control system detects a clearance of the DC fault condition.

4. The system of claim 1 wherein each half bridge cell of the first plurality of half bridge cells and the second plurality of half bridge cells includes a pair of series coupled semiconductor switches and a capacitor, and wherein the control system is configured to operate the semiconductor switches during the fault condition mode so as to prevent capacitor discharge of the capacitor of each half bridge cell.

5. The system of claim 1 wherein each full bridge cell includes two pairs of series coupled semiconductor switches and wherein the control system operates the second converter arm so as to interrupt current flowing between the midpoint connection and the second DC bus rail by opening each of the semiconductor switches.

6. The system of claim 1, wherein the converter is structured to receive three phase AC power.

7. A fault isolation system comprising:
a modular multilevel converter (MMC) including:
  an input port structured to be coupled to a multiphase AC power source, the input port being a midpoint connection of the MMC,
  a first output port structured to be coupled to a first DC bus rail, and
  a second output port structured to be coupled to a second DC bus rail,
  a first converter arm comprising a first plurality of half bridge cells and coupled between the input port and the first DC bus rail, and
  a second converter arm comprising a second plurality of half bridge cells and at least one full bridge cell, the second converter arm coupled between the input port connection and the second DC bus rail;
a protective device coupled to the first output port and structured to interrupt current flow through the first DC bus rail; and
a control system coupled to the MMC and the protective device, and configured to detect a DC fault condition, operate the MMC in a fault condition mode so as to interrupt current flow from the input port to the second output port in response to detecting the DC fault condition, operate the MMC so as to allow AC power flow from the input port to the first output port in response to detecting the DC fault condition, detect a zero current condition at the first output port, and interrupt current flow through the first DC bus rail using the protective device in response to detecting a zero current condition at the first output port;
wherein the fault condition mode operates the at least one full bridge cell of the second converter arm so as to interrupt current flowing between the input port and the second DC bus rail and operates the first converter arm so as to allow the AC power to flow between the midpoint connection and the first DC bus rail in response to detecting the DC fault condition.

8. The system of claim 7, wherein the protective device is a DC circuit breaker.

9. The system of claim 7, wherein the MMC includes three upper arms, each arm including a plurality of series coupled half bridge cells coupled between the input port and the first output port such that each phase of the AC power received with the MMC is separately coupled to one arm of the MMC.

10. The system of claim 9 wherein the MMC includes three lower arms, each arm including a full bridge cell coupled between the input port and the second output port such that each phase of the AC power received with the MMC is separately coupled to one arm of the MMC.

11. The system of claim 10, wherein each of the three lower arms includes a plurality of half bridge cells.

12. The system of claim 7, wherein the control system is a plurality of controllers.

13. The system of claim 7, wherein the control system is configured to operate the MMC in a normal operation mode so as to receive the multiphase AC power and convert the multiphase AC power to DC power, and wherein the control system is configured to operate the MMC in normal operation mode in response to interrupting current flow through the first DC bus rail using the protective device, to detect a clearance of the DC fault condition, and to close the protective device in response to detecting the clearance of the DC fault condition.

14. A method for operating a modular multilevel converter (MMC) comprising:
coupling an MMC input to a power source, the MMC input being a midpoint connection;
coupling a first MMC output to a first DC bus rail;

coupling a first converter arm of the MMC comprising a first plurality of half bridge cells between the input to the power source and the first DC bus rail, and coupling a second MMC output to a second DC bus rail;

coupling a second converter arm of the MMC comprising a second plurality of half bridge cells and at least one full bridge cell between the input port connection and the second DC bus rail;

coupling a DC protective device to the first DC bus rail;

operating the MMC in a first operating mode including receiving power with the MMC input, converting the power to DC power, and outputting the DC power with the first MMC output and the second MMC output;

detecting a DC fault condition; and operating the MMC in a second mode in response to detecting a DC fault condition including receiving power with the MMC input, interrupting current flow between the MMC input and the second MMC output, transmitting the received power between the MMC input to the first MMC output, detecting a zero current condition on the first DC bus while operating the MMC in the second mode, and opening the DC protective device during the zero current condition;

wherein the second mode is a fault condition mode which operates the at least one full bridge cell of the second converter arm so as to interrupt current flowing between the midpoint connection and the second DC bus rail and operates the first converter arm so as to allow the AC power to flow between the midpoint connection and the first DC bus rail in response to detecting the DC fault condition.

15. The method of claim 14, comprising operating the MMC a second time in the normal operating mode, detecting a resolution of the DC fault condition, and closing the DC protective device in response to detecting the resolution of the DC fault condition.

16. The method of claim 14 wherein the MMC includes a plurality of half bridge cells coupled in series between the MMC input and the first MMC output and does not include a full bridge cell coupled between the MMC input and the first MMC output.

17. The method of claim 14, wherein the DC power is medium voltage direct current power or high voltage direct current power.

* * * * *